(12) United States Patent
Naylor et al.

(10) Patent No.: US 10,963,409 B2
(45) Date of Patent: Mar. 30, 2021

(54) INTERCONNECT CIRCUITRY AND A METHOD OF OPERATING SUCH INTERCONNECT CIRCUITRY

(71) Applicant: ARM Limited, Cambridge (GB)

(72) Inventors: Rowan Nigel Naylor, Cambridge (GB); Phanindra Kumar Mannava, Austin, TX (US); Bruce James Mathewson, Cambridge (GB)

(73) Assignee: Arm Limited, Cambridge (GB)

( * ) Notice: Subject to any disclaimer, the term of this patent is extended or adjusted under 35 U.S.C. 154(b) by 729 days.

(21) Appl. No.: 15/241,461

(22) Filed: Aug. 19, 2016

(65) Prior Publication Data

US 2018/0052790 A1 Feb. 22, 2018

(51) Int. Cl.
*G06F 13/362* (2006.01)
*H04L 12/707* (2013.01)

(52) U.S. Cl.
CPC ............ *G06F 13/362* (2013.01); *H04L 45/22* (2013.01); *H04L 2209/24* (2013.01)

(58) Field of Classification Search
CPC .... G06F 13/362; H04L 45/22; H04L 2209/24
See application file for complete search history.

(56) References Cited

U.S. PATENT DOCUMENTS

| | | | | |
|---|---|---|---|---|
| 6,151,651 A * | 11/2000 | Hewitt | ................ | G06F 13/4054 710/315 |
| 6,650,142 B1 * | 11/2003 | Agrawal | .......... | H03K 19/17728 326/39 |
| 6,721,316 B1 * | 4/2004 | Epps | ....................... | H04L 45/60 370/360 |
| 7,177,276 B1 * | 2/2007 | Epps | ....................... | H04L 47/10 370/230 |
| 7,334,125 B1 * | 2/2008 | Pellacuru | ................ | H04L 9/083 380/277 |
| 2003/0217115 A1 * | 11/2003 | Rowlands | ............. | G06F 12/082 709/214 |

(Continued)

*Primary Examiner* — Eric T Oberly
(74) *Attorney, Agent, or Firm* — Leveque IP Law, P.C.

(57) ABSTRACT

An interconnect circuit, and method of operation of such an interconnect circuit, are provided. The interconnect circuitry has a first interface for coupling to a master device and a second interface for coupling to a slave device. Transactions are performed between the master device and the slave device, where each transaction comprises or more transfers, and each transfer comprises a request and a response. A first connection path between the first interface and the second interface is provided that comprises a first plurality of pipeline stages. The first connection path forms a default path for propagation of the requests and responses of the transfers. A second connection path is also provided between the first interface and the second interface that comprises a second plurality of pipeline stages, where the second plurality is less than the first plurality. Path selection circuitry is then used to determine presence of a fast path condition. In the presence of the fast path condition, the path selection circuitry causes at least one of the request and the response for one or more transfers to be propagated via the second connection path. This can significantly reduce the latency associated with the handling of transfers within the interconnect circuitry, and hence improves the overall performance of the interconnect circuitry.

22 Claims, 10 Drawing Sheets

(56) References Cited

U.S. PATENT DOCUMENTS

2004/0267994 A1* 12/2004 Mathewson ........ G06F 15/7867
710/110
2015/0378946 A1* 12/2015 Ali ......................... G06F 13/28
710/308
2017/0099052 A1* 4/2017 Chakrabarti ..... H03K 19/17744

* cited by examiner

INTERCONNECT CIRCUITRY AND A METHOD OF OPERATING SUCH INTERCONNECT CIRCUITRY

BACKGROUND

The present technique relates to interconnect circuitry and a method of operating such interconnect circuitry.

It is known to provide interconnect circuitry for interconnecting a number of master devices with a number of slave devices, to enable transactions to be performed between the master devices and the slave devices in order to transfer data between the master and slave devices. Each transaction between a master device and a slave device may comprise one or more transfers, where each transfer comprises a request from the master device to the slave device and a response from the slave device to the master device. Typically a predetermined bus protocol is used defining requirements for the various signals routed through the interconnect circuitry to represent the transfers, and allowed transitions in those signals.

Whilst the exact form of the signals representing the requests and the responses of each transfer will vary dependent on the bus protocol used, the underlying physical connections within the interconnect circuitry can limit the performance of the interconnect circuitry irrespective of the bus protocol used. For example, within a traditional interconnect circuit a request and its associated response are typically routed through the same basic path within the interconnect circuitry. For example, the path through the interconnect circuitry may be determined using the request, with that same path subsequently being used for the response. As a result, there tend to be similar latencies experienced in both requests and responses of transfers, and these latencies can reduce the overall performance of the interconnect circuitry.

It would be desirable to provide an improved interconnect circuit that can enable latency to be reduced.

SUMMARY

In one example configuration there is provided interconnect circuitry comprising: a first interface to couple to a master device; a second interface to couple to a slave device, transactions being performed between the master device and the slave device, where each transaction comprises one or more transfers, each transfer comprising a request and a response; a first connection path between the first interface and the second interface comprising a first plurality of pipeline stages, the first connection path forming a default path for propagation of the requests and responses of the transfers; a second connection path between the first interface and the second interface comprising a second plurality of pipeline stages, where the second plurality is less than the first plurality; and path selection circuitry to determine presence of a fast path condition, in the presence of the fast path condition the path selection circuitry causing at least one of the request and the response for one or more transfers to be propagated via the second connection path.

In another example configuration there is provided a method of operating interconnect circuitry having a first interface to couple to a master device, and a second interface to couple to a slave device, transactions being performed between the master device and the slave device, where each transaction comprises one or more transfers, each transfer comprising a request and a response, the method comprising: providing a first connection path between the first interface and the second interface comprising a first plurality of pipeline stages, the first connection path forming a default path for propagation of the requests and responses of the transfers; providing a second connection path between the first interface and the second interface comprising a second plurality of pipeline stages, where the second plurality is less than the first plurality; and determining presence of a fast path condition, and in the presence of the fast path condition propagating at least one of the request and the response for one or more transfers via the second connection path.

In a yet further example configuration there is provided interconnect circuitry comprising: first interface means for coupling to a master device; second interface means for coupling to a slave device, transactions being performed between the master device and the slave device, where each transaction comprises one or more transfers, each transfer comprising a request and a response; first connection path means between the first interface means and the second interface means comprising a first plurality of pipeline stages, the first connection path means for forming a default path for propagation of the requests and responses of the transfers; second connection path means between the first interface means and the second interface means comprising a second plurality of pipeline stages, where the second plurality is less than the first plurality; and path selection means for determining presence of a fast path condition, in the presence of the fast path condition the path selection means for causing at least one of the request and the response for one or more transfers to be propagated via the second connection path means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
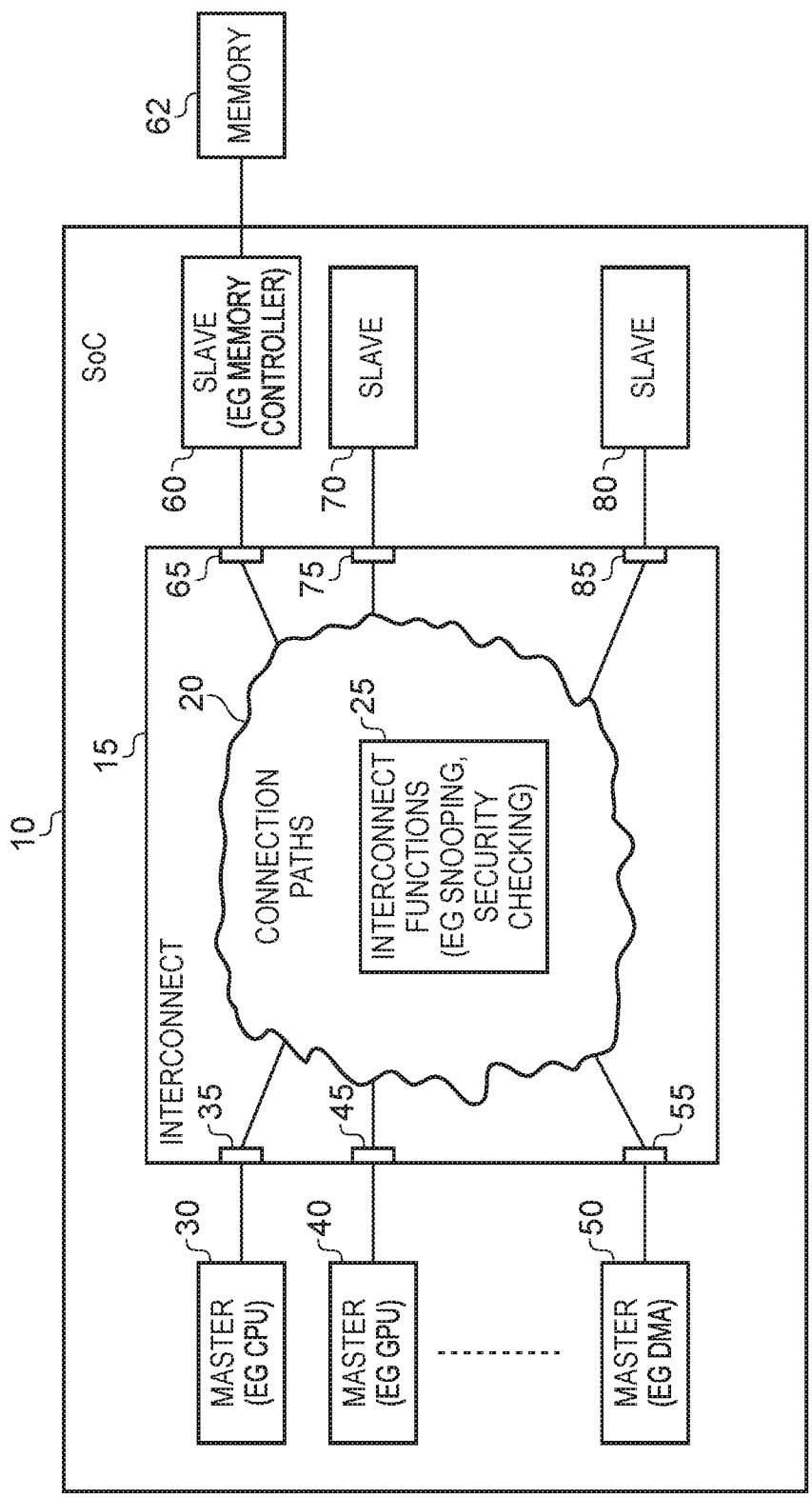
FIG. 1 is a block diagram of a system incorporating interconnect circuitry in accordance with one embodiment.

Before discussing the embodiments with reference to the accompanying figures, the following description of embodiments is provided.

In one embodiment interconnect circuitry is provided that has a first interface for coupling to a master device and a second interface for coupling to a slave device. Transactions may be performed between the master device and the slave device, where each transaction comprises one or more transfers, and each transfer comprises a request and a response. The signals that represent a request and a response of each transfer will typically vary dependent on the bus protocol used.

Within the interconnect circuitry, a first connection path is provided between the first interface and the second interface, that first connection path comprising a first plurality of pipeline stages. The first connection path forms a default path for propagation of the requests and responses of the transfers. In addition to the first connection path, a second connection path between the first interface and the second interface is provided that comprises a second plurality of pipeline stages, where the second plurality is less than the first plurality. Path selection circuitry is then provided to determine presence of a fast path condition. In the presence of the fast path condition, the path selection circuitry causes at least one of the request and the response for one or more transfers to be propagated via the second connection path. Hence, whilst for a transfer between a particular master device and a particular slave device there may be a default first connection path to use, when the fast path condition is detected this causes that default to be deviated from, and instead the second connection path is used for the request and/or the response of that transfer.

By such an approach, it has been found that a significant reduction in latency can be achieved in certain situations by avoiding the requirement for the request and response of a transfer to necessarily follow the same path through the interconnect circuitry. By reducing latency, this enables the overall performance of the interconnect circuitry to be improved. In particular, through use of the above described approach, this enables the removal of certain clock cycles and/or the hiding of certain clock cycles in the transport of transfers of transactions through the interconnect circuitry. Further, the approach described above can be arranged to be bus protocol agnostic, and so can be used in many different forms of interconnect circuitry independent of the particular bus protocol used.

There are a number of forms of interconnect circuitry that can benefit from the use of the first and second connection paths and path selection circuitry as described above. In one embodiment the interconnect circuitry has processing circuitry to initiate an analysis operation for a transfer, that produces an analysis response that influences usability of a response generated by the slave device for that transfer, the processing circuitry being located within the first connection path.

The processing circuitry can take a variety of forms. For example, in a system employing cache coherency, the processing circuitry may take the form of snoop circuitry used to employ a cache coherency protocol in order to maintain coherency in the data held in the caches of the various master devices connected to the interconnect circuitry. In that embodiment, the analysis operation takes the form a coherency operation performed in respect of one or more master devices coupled to the interconnect circuitry, and the analysis response comprises a snoop response. The snoop response can take a variety of forms dependent on the cache coherency protocol employed, but in some instances may include a copy of data held in a local cache of one of the master devices, to be used instead of any data provided by the slave device when providing a response to a request issued by another master device.

As another example of processing circuitry that may be provided in an interconnect, in a security-based system the processing circuitry may comprise security checking circuitry which performs, as the analysis operation, a security operation. In such an embodiment, the analysis response may include information that controls use of the response generated by the slave device. It may for example identify whether the master device is allowed to perform the transfer, and hence whether it can use any response from the slave device, or may for example provide a decryption key that is used to decrypt the data provided in the response generated by the slave device.

Accordingly, it will be understood that the interconnect circuitry may include processing circuitry that, for at least a subset of the transfers, needs to be employed to perform some analysis operation in respect of that transfer. However, whilst this may mean that the first connection path has to be used to an extent for the transfer, in some embodiments it may still be possible to make use of the second connection path so as, for example, to speculatively perform a portion of the transfer whilst awaiting the analysis response, thereby hiding some of the latency that would otherwise be associated with the handling of the transfer.

Furthermore, in one embodiment, if a current transfer has no requirement for the analysis operation, then this can be used to indicate to the path selection circuitry one type of occurrence of the fast path condition, enabling the second connection path to be used. In one such embodiment, the second connection path can be used for both the request and the response of such a transfer.

However, in one embodiment, if a current transfer does require the analysis operation to be performed, the path selection circuitry is arranged to evaluate specified criteria to determine whether said fast path condition is present and, in the presence of said fast path condition, to cause both the first connection path and the second connection path to be used for the current transfer. Hence, in accordance with such embodiments, the path selection circuitry causes a combination of the first connection path and the second connection path to be used in order to seek to reduce the overall latency of the handling of the current transfer.

There are a number of ways in which the first connection path and the second connection path can be used in combination for a transfer. In one embodiment, the path selection circuitry is arranged to cause the request of the current transfer to be propagated via the first connection path and the response of the current transfer from the slave device to be propagated via the second connection path. Hence, the request may for example be propagated through the first connection path to the processing circuitry to initiate the analysis operation, with the processing circuitry then being responsible for forwarding on the request through the remainder of the first connection path to the second interface to allow it to be processed by the slave device. It may, for example, be arranged only to forward that request on to the second interface once the analysis response is available. However, alternatively, with the aim of reducing latency, it may speculatively forward the request on to the second interface whilst the analysis operation is being performed. This enables the slave device to process the request, and produce the response, with the use of that response being controlled dependent on the analysis response from the processing circuitry. Irrespective of which option is taken, the time taken to route the response back to the first interface can be reduced through use of the second connection path.

In an alternative embodiment, the path selection circuitry may be arranged to cause the request of the current transfer to be propagated via the first connection path to the processing circuitry and via the second connection path to the second interface, and the response of the current transfer from the slave device to be propagated via the second connection path. Hence, in such an embodiment, the request is sent out over both the first connection path and the second connection path, with the second connection path being used to route the request to the second interface. This hence enables a speculative processing of the request by the slave device without awaiting the analysis response from the processing circuitry in the first connection path. Further, by routing the response from the slave device via the second connection path, this further improves the performance of the handling of the transfer between the first and second interfaces. Such an approach can be used to improve the overall performance and at least partially hide the latency associated with performance of the analysis operation.

Whilst in one embodiment the master device may be able to make use of the response of the current transfer from the slave device without awaiting the analysis response from the processing circuitry (for example if the master device has mechanisms to rewind the processing it performs if it is later determined from the analysis response that the response provided by the slave device should not have been used), in an alternative embodiment the master device may be prevented from making use of the response of the current transfer from the slave device before the analysis response is provided by the processing circuitry.

This can be achieved in a variety of ways. For example, in one embodiment, whilst the second connection path may be used to expedite obtaining of the response from the slave device, a mechanism could be provided within the interconnect circuitry to prevent that response actually being passed back to the master device until the analysis response is available, and that analysis response has indicated that the response from the slave device should be forwarded back to the master device. For example, a buffer circuit may be provided within the first interface for this purpose, enabling the response to be speculatively obtained from the slave device and routed through the interconnect back to the first interface, but with that response then being held at the first interface until a predetermined condition is met. Whilst one such predetermined condition may be the provision of any required analysis response from the processing circuitry, other predetermined conditions could be used. For example, typically an interconnect circuit may be used to connect multiple masters and multiple slaves, and for multiple master-slave combinations the interconnect circuitry may provide a first, default, connection path and a second, reduced latency, connection path. To allow for certain transaction reordering, dependencies between two responses to be accounted for, etc, it would also be possible to use the buffering mechanism in the first interface to buffer responses until such time as it is determined that they can be used by the master device.

Whilst in one embodiment the first interface may be used to provide such buffer circuitry, in an alternative embodiment, or in addition, the second connection path itself may include buffer circuitry to buffer the response of the current transfer from the slave device until the predetermined condition is met. This could, for example, be useful where a portion of the second connection path is shared between multiple instances of the second connection path (for example, the different instances being associated with different master-slave combinations), where such a buffer circuit could also incorporate some multiplexing circuitry to provide buffering and reordering of responses as required.

The first and second connection paths can take a variety of forms, and there may be various components within those connection paths that contribute to the number of pipeline stages. In one particular embodiment, the first connection path comprises multiple asynchronous bridge components, each asynchronous bridge component comprising multiple pipeline stages, and the second connection path comprises less asynchronous bridge components than are provided within the first connection path. It is known to provide asynchronous bridge components for a number of reasons, for example to deal with certain timing issues that can arise when propagating a clock signal over relatively long distances within an integrated circuit. Such asynchronous bridge components will typically comprise multiple pipeline stages. Accordingly, each asynchronous bridge component will often have a significant contribution to the overall latency of the path. By providing the second connection path with less asynchronous bridge components than the first connection path, it is possible to significantly reduce the latency associated with the second connection path, when compared with the first connection path, enabling significant performance improvements to be realised in situations where the second connection path can be used.

The specified criteria that is evaluated by the path selection circuitry in order to determine whether the fast path condition is present, in situations where the current transfer requires the analysis operation to be performed, can take a variety of forms. In one embodiment the specified criteria identifies one or more properties which the transfer is to have in order to trigger the fast path condition. The properties can take a variety of forms, for example an indication of the slave device forming the destination, an indication of the actual address to be accessed, the source identifier associated with the master device (in some embodiments master devices can have multiple different source identifiers that may be used for transfers, and accordingly it may be decided to restrict the use of the second connection path to certain source identifiers), etc. Such information will typically be provided by one or more of the signals forming a request of at least one transfer of a transaction, and accordingly can be analysed by the path selection circuitry on a transfer-by-transfer basis. Another example of properties of the transfer that might trigger the fast path condition is quality of service information, which may for example be indicative of a relative priority to be associated with one or more transfers. The quality of service information could be specified on a transfer-by-transfer basis, but might alternatively be specified at a system level, where certain master devices (or source identifiers) are identified as having a higher quality of service requirement than other masters (or source identifiers).

As an alternative, or in addition, when evaluating the specified criteria, the path selection circuitry may be arranged to reference history data maintained about previous transfers routed between the first and second interfaces. This history data can take a variety of forms. For example, in an embodiment where the processing circuitry takes the form of snoop circuitry, the history data may provide information that is indicative of the likelihood that a response from the slave device will be discarded based on the snoop response. This may for example then be used to influence whether the second connection path should be used or not for a current transfer.

In some embodiments, the path selection circuitry may be arranged to provide control information for at least one of the request and the response of a transfer to identify which of the first connection path and the second connection path is to be used. The control information could take a variety of forms. For example, the control information may comprise one or more flags used to identify the transfer as being of a particular type, and for certain types of transfer the second connection path may be used. For example, the transfer may be marked as a speculative transfer, and in that instance it may be determined to use the second connection path. As an alternative to the use of flags, the control information may take the form of sideband data provided in association with one or more signals forming the request and/or response of a transfer.

The path selection circuitry can be provided at a variety of locations within the interconnect circuitry. In one embodiment, the path selection circuitry is provided in association with at least one of the first interface and the second interface. In one particular embodiment, the path selection circuitry is provided in association with the first interface in order to make decisions about the use of the first connection path and the second connection path at the time a request for a particular transfer is received by the first interface from the master device. However, in some embodiments, a path selection circuit component could also be provided in association with the second interface. Such a component could be arranged to determine to use the second connection path in certain instances, even when any decision made by the path selection circuit component at the first interface did not decide to use the second connection path. This could for example arise in embodiments where the path selection circuit component at the first interface did not dictate use of a particular path (either by only indicating a preference rather than a requirement for use of a particular path, or by indicating that it has no preference). In such a situation, such an additional path selection circuit component within the second interface may decide to use the second connection path for a response, in situations where it is clear that a second connection path exists back to the first interface for the relevant master device, and that second connection path is currently either determined to be underutilized or not being used.

As mentioned earlier, certain buffering circuits may be provided within the interconnect circuitry to buffer responses from the slave device until such time that it is determined appropriate to forward them to the master device. In an alternative embodiment, a master device itself may be provided with buffer circuitry to buffer the response of a current transfer from the slave device until a predetermined condition is met. Accordingly, the buffer circuitry can be arranged to effectively quarantine the response until the condition is met, and only once that condition is met to then release the response from quarantine and allow it to be used by the master device. The predetermined condition can take a variety of forms. For example, it may be that the response needs to be quarantined until the analysis response from the processing circuitry has been obtained and provided back to the master device to identify whether the response can in fact be used. As another example, by quarantining the response, certain reordering of responses can be facilitated such that a response being held in the buffer can be quarantined until a response of an earlier transfer has become available to the master device. This improves the flexibility and the use of the second connection path to improve performance when handling certain transfers.

Whilst the master device may be provided with a separate, dedicated, buffer circuit, in an alternative embodiment the buffer circuitry may be implemented within a cache of the master device, the cache providing state information in association with each cache line to identify whether the data in that cache line is buffered data awaiting said predetermined condition. Master devices will typically have local cache structures within them, and accordingly this provides a particularly efficient solution for implementing the buffer circuitry. All that is required is to provide the cache with suitable state information to capture situations where the cache line's contents form buffer data awaiting occurrence of the predetermined condition, and accordingly cannot yet be used by the master device.

Particular embodiments will now be descried with reference to the figures.

FIG. 1 is a block diagram of a system in accordance with one embodiment. The system 10 consists of a plurality of master devices 30, 40, 50 that are coupled via interconnect circuitry 15 with a plurality of slave devices 60, 70, 80. The master devices can take a variety of forms. For example, one or more of the master devices may be central processing units (CPUs), whilst other master devices may be graphics processing units (GPUs), direct memory access (DMA) units, etc. Similarly the slave devices can take a variety of forms, for example memory devices such as SRAM or FLASH, general purpose I/O devices (GPIOs), display buffers, etc. In one embodiment, the system shown in FIG. 1 forms a System-on-Chip (SoC) where the various master devices, slave devices, and the interconnect circuitry are integrated into a single chip. In such an arrangement, one or more of the slave devices may in fact form interface circuitry to an off-chip component, such as illustrated by way of example with reference to the slave device 60 in FIG. 1, which may take the form of a memory controller for controlling off-chip memory 62.

The interconnect circuitry 15 has a plurality of interfaces 35, 45, 55, 65, 75, 85 for connection to the various master and slave devices. The interconnect 15 then provides multiple connection paths 20 for interconnecting the various interfaces in order to enable a master device coupled to one of the interfaces to initiate a transaction with a desired slave device via the slave device's interface to the interconnect. The connection paths will typically consist of multiple pipeline stages, and in addition may incorporate processing circuitry that performs particular interconnect functions, as indicated by the box 25 in FIG. 1.

For example, in a cache coherent system one of the interconnect functions 25 may take the form of snoop circuitry, which is arranged to apply a cache coherency protocol in order to ensure that each of the master devices accesses the most up-to-date version of the data that it is requesting, taking into account the fact that the data being requested may be cached by another device master. Typically, this may involve a request from one master device relating to a cacheable address being reviewed by the snoop circuitry to determine whether any of the other master devices may hold a copy of that data, and if so the snoop circuitry then issues snoop requests to those various other master devices and awaits a snoop response from those master devices. The snoop response will typically identify whether the snooped master device does indeed have a copy of the requested data, and, dependent on the cache coherency protocol being employed, may result in a copy of that data being returned to the snoop circuitry. If one of the other master devices has cached the data being requested, then the snoop circuitry may return that data directly to the requesting master device without the slave device needing to be contacted. Alternatively, if none of the snooped master devices contain a copy of the data, then the data will instead be accessed in the slave device addressed by the original request.

As another example of an interconnect function that may be provided within the connection paths 20, in a security-based system, it may be the case that certain master devices are prohibited from accessing certain slave devices, or certain address ranges. A security function can be implemented as an interconnect function 25 to check access rights for access requests, and prevent accesses taking place that are not allowed having regard to the security rules. In another embodiment, the data stored in the slave devices may be encoded, and for a read access request an interconnect function 25 may be used to obtain a security key that is to be used to decode the data returned from the slave device, with that obtained key being returned to the master device along with the encoded data retrieved from the slave device.

As discussed earlier, through use of the interconnect circuitry 15, transactions can be performed between the master devices 30, 40, 50 and the slave devices 60, 70, 80 in order to transfer data between the master and slave devices in either direction. Each transaction between a master device and a slave device will comprise one or more transfers, where each transfer comprises a request from the master device to the slave device and a response from the slave device to the master device. The form and/or the timing of the signals used to represent each request and response will vary dependent on the bus protocol used within the interconnect. A single transaction may specify a single address (often referred to as a non-burst transaction), or a single transaction may identify a sequence of addresses to be accessed (often referred to as a burst transaction). In some bus protocols, such as ARM's Advanced High-performance Bus (AHB) protocol or Advanced eXtensible Interface (AXI) protocol, a separate transfer may be associated with each address, and hence a non-burst transaction may be considered to involve a single transfer and a burst transaction may be considered to comprise multiple transfers. Each transfer may involve the transmission of certain master control signals (for example including the address, transaction type, etc) that form the request, and the transmission of certain response signals from the slave device to the master device that form the response of the transfer. For a write transaction, the write data may form part of the request, whilst for a read transaction the read data may form part of the response.

In accordance with other bus protocols, for example ARM's Coherent Hub Interface (CHI) protocol, the transaction can be broken down further into a larger number of transfers, with each transfer involving one or more signals forming a request and one or more signals forming a response.

Irrespective of the bus protocol used, it has been found that the physical arrangement of the interconnect circuitry can give rise to certain latency problems in the handling of transactions, which can reduce the overall performance of the interconnect circuitry. In particular, the arrangement of the connection paths 20 may mean that when a particular master initiates a transaction to a particular slave, a connection path is established between that master device's interconnect interface and that slave device's interconnect interface that defines a predetermined route through the interconnect circuitry that is used for both the request and the associated response that form the transfer(s) of that transaction. Similar latencies can hence be experienced in both the request and response of each transfer, which can reduce the overall performance. Further, certain of the interconnect functions 25 will take multiple clock cycles to perform their operations, and this can add to the overall latency experienced in handling the transactions within the interconnect circuitry 15. The techniques described hereafter provide an arrangement of interconnect circuitry that enables the latency to be reduced in certain situations, thereby improving the overall performance of the interconnect circuitry.

Figure 2:
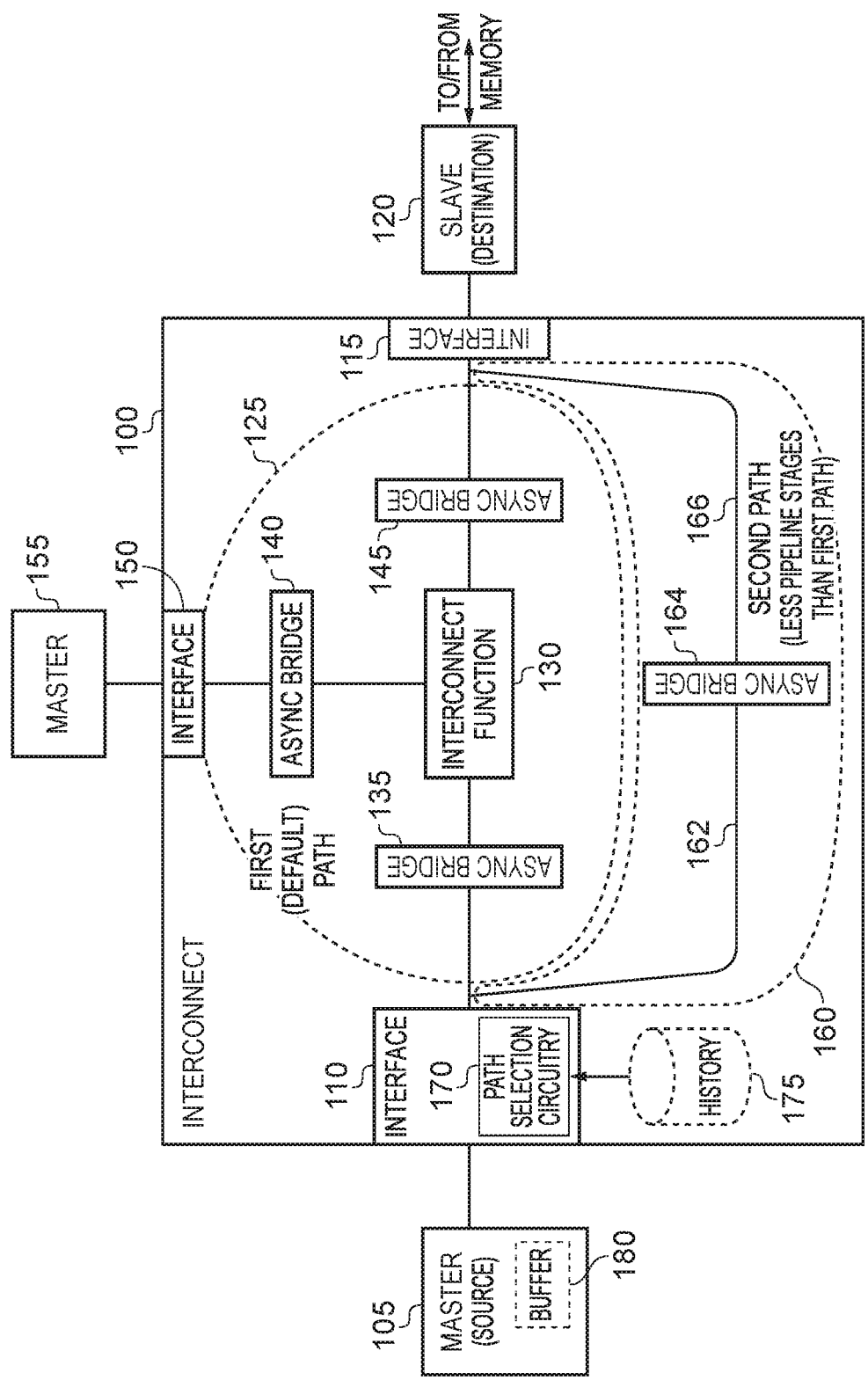
FIG. 2 is a diagram illustrating a portion of the interconnect circuitry of FIG. 1 in accordance with one embodiment.

FIG. 2 is a block diagram illustrating a portion of the interconnect circuitry that may be provided between one interface to a master device and one interface to a slave device. In particular, the master device 105 is connected to the interface 110 (which may be considered to be one of the interfaces 35, 45, 55 shown in FIG. 1), and the slave device 120 is connected to the interface 115 (which may be considered to be one of the interfaces 65, 75, 85 shown in FIG. 1). Between these two interfaces 110, 115 a first, default, connection path 125 is provided that incorporates the interconnect function 130, a number of further components such as the asynchronous bridge components 135, 140, 145, shown in FIG. 2, and the intervening wiring encircled by the box 125 (individual wires not having been labelled separately in FIG. 1). It will be appreciated that there may be a number of further components within the default path in addition to the asynchronous bridges and interconnect function. However, for simplicity, only the interconnect function and the associated asynchronous bridges are shown. The interconnect function may perform any required function, for example snooping, security checking, etc, and as part of the performance of those functions will typically need to communicate with at least one other component, illustrated by way of example in FIG. 2 with reference to the master device 155 and associated interface 150.

The first, default, path will consist of a plurality of pipeline stages, and as a result it will take multiple clock cycles to propagate signals over the first default path 125 between the master device and the slave device, or vice versa. The asynchronous bridge components 135, 140, 145 provide a globally asynchronous, locally synchronous (GALS) arrangement for the interconnect function 130, ensuring that all of the operations performed within the portion of circuitry surrounded by the asynchronous bridges (including the interconnect function 130) are performed synchronously. Each asynchronous bridge will typically comprise multiple pipeline stages, and accordingly the provision of such asynchronous bridges can contribute significantly to the total number of pipeline stages within the path.

In accordance with the described embodiments, a further, second, connection path 160 is provided between the two interfaces 110, 115 that can selectively be chosen instead of the first path 125 under certain situations, in order to route the request and/or response of one or more transfers between the two interfaces. As shown schematically in FIG. 2, the second path is significantly less complex than the first path, and in the example shown includes a single asynchronous bridge 164 and associated wiring 162, 166 extending between the two interfaces 110, 115. As with the first path, there may be one or more additional components provided within the second path 160, but the second path 160 has less pipeline stages than the first path 125. Accordingly, when it is possible to use the second path 160 instead of the first path 125 for the request and/or response of one or more transfers, this can reduce the latency involved in the handling of those transfers, and hence improve the overall performance of the interconnect.

As shown in FIG. 2, path selection circuitry 170 is provided for determining situations where the second path 160 can be employed instead of, or in addition to, the first path 125. The path selection circuitry can be provided at a variety of locations within the interconnect, but in FIG. 2 it is assumed to form part of the interface circuitry 110 associated with the master 105. The path selection circuitry 170 can have regard to certain properties of the transfers being initiated from the master device in order to determine which of the two paths 125, 160 to use, and, in addition, or alternatively, can have access to certain history information 175 providing information about the handling of previous similar transfers within the interconnect. This will be discussed in more detail later, but as an example the history information may identify situations where the interconnect function 130 was required and/or where the analysis response produced by the interconnect function prevented or qualified use of the response provided from the slave 120.

As will also be discussed in more detail later, when the second path 160 is used, this may result in a response from the slave 120 being made available to the master before the master is allowed to make use of that response. In one embodiment, a local buffer 180 may be provided within the master device for buffering such an early response until it has been confirmed that the master can use the response. In one particular embodiment, as will be described later with reference to FIG. 7, the functionality of the buffer may be incorporated within a pre-existing cache of the master device.

Figure 3:
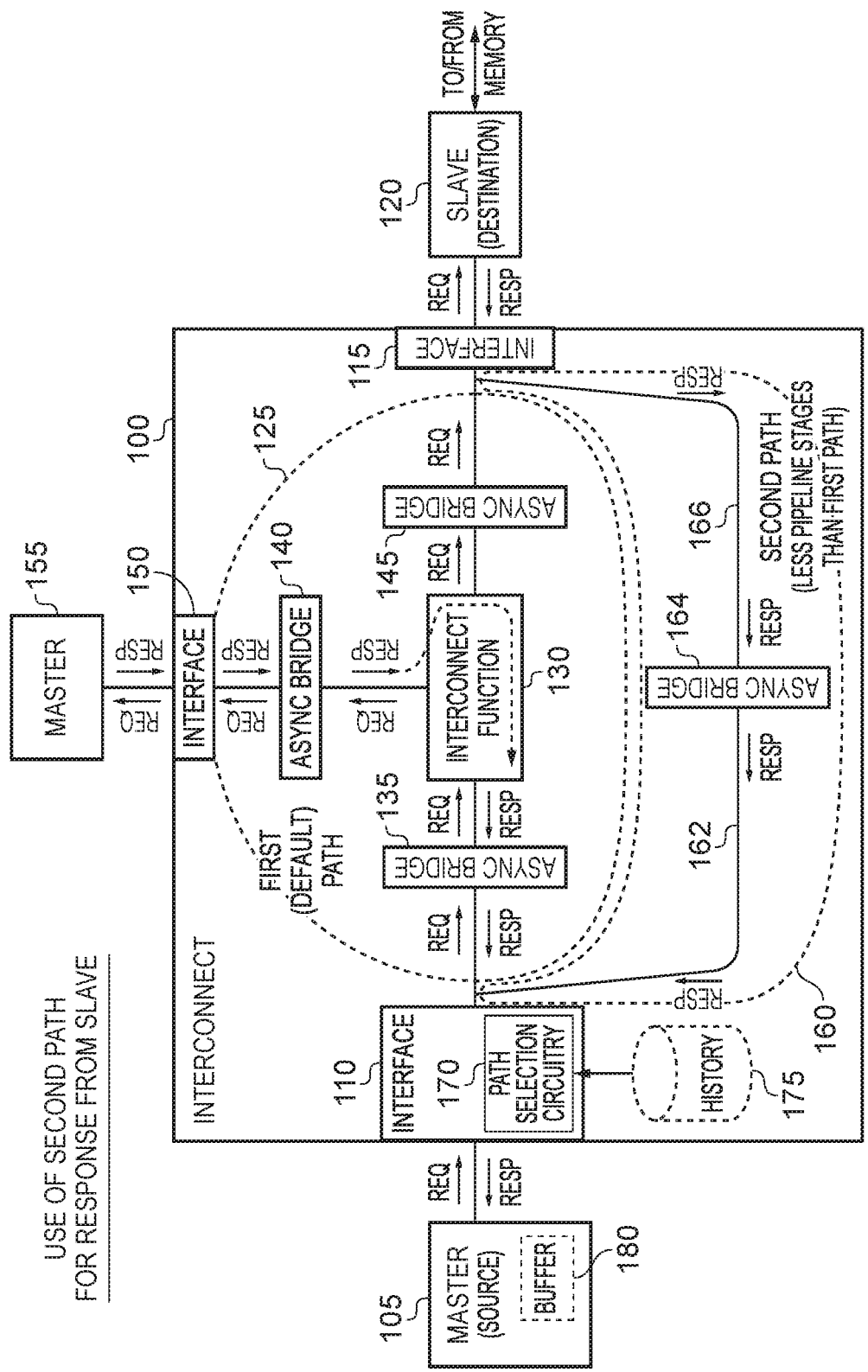
FIGS. 3 to 5 illustrate three different approaches that may be taken for the routing of requests and responses through the interconnect circuitry shown in FIG. 2.

FIG. 3 illustrates one example use case of the first and second paths. In this example, it is assumed that the path selection circuitry 170 determines that, for a current transfer, it is necessary for the interconnect function 130 to be used, and accordingly the request is propagated to the first path 125, and in particular is propagated from the interface 110 via the asynchronous bridge 135 to the interconnect function 130. As part of the performance of the analysis operation performed by the interconnect function, it is assumed that this requires a request to be propagated on to the master device 155, and the response from that master device awaited.

In one embodiment, the interconnect function 130 may await the response from the master device 155 before deciding whether the request needs to be propagated on to the slave 120, but in an alternative embodiment it is assumed that the interconnect function 130 speculatively propagates the request on via the asynchronous bridge 145 and the interface 115 to the slave 120, so that the slave can process the request in parallel with the operations being performed by the interconnect function 130.

In one embodiment, the path selection circuitry 170 provides control information in association with the transfers to identify whether any use is to be made of the second path 160. In this example, it is assumed that that control information informs the interface 115 that the response returned from the slave should be routed via the second path 160. There are a number of ways in which this could be done. For example, the path selection circuitry may set one or more flags to identify a transfer type for a transfer. By such an approach, the request may be identified as being speculative, which may for example cause the interconnect function 130 to speculatively forward the request on to the slave whilst it is performing its analysis operation, and that same control information may also indicate to the interface 115 that the response should be routed via the second path 160. As an alternative to the use of flags, the path selection circuitry may provide sideband data with one or more signals forming the transfer to identify the path to be taken.

It will be seen that use of the second path will reduce the latency involved in obtaining the response from the slave and returning it back to the master. However, there is a prospect that the master will then receive the response before the analysis result is available from the interconnect function, and hence before it is known for certain whether that response can be used. As discussed earlier, in one embodiment the response can be buffered locally in the buffer 180 of the master, where it is effectively quarantined until such time as the analysis response from the interconnect function is available and has been returned to the master to confirm whether the response from the slave can be used or not.

In one embodiment, at least part of the path selection circuitry may be replicated within the interface 115, so that in certain instances the interface 115 could unilaterally decide to use the second path for returning the response to the interface 110. The path selection circuitry in the interface 115 could, for example, determine to use the second path for the response dependent on information pertaining to the availability of the second path.

Figure 4:
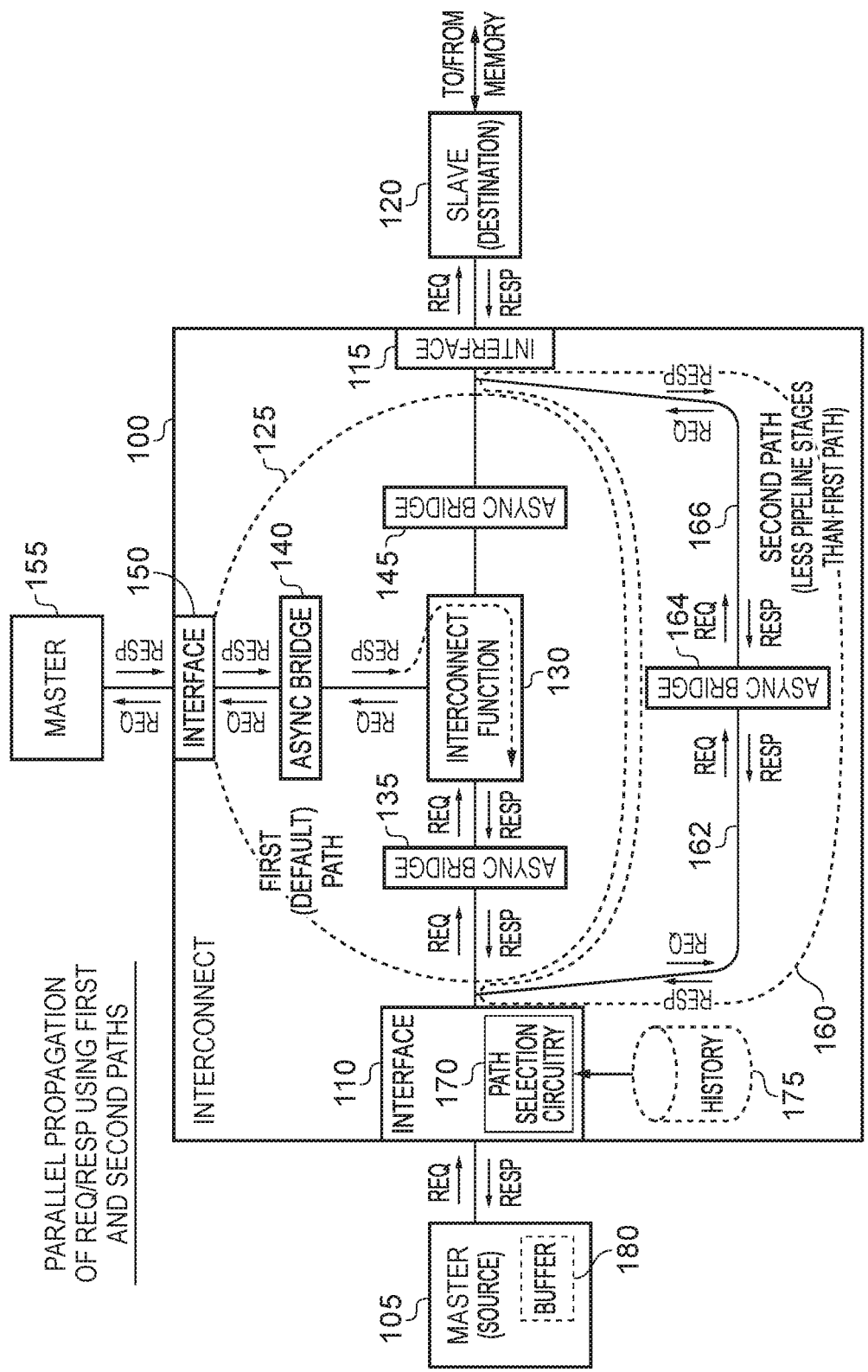

FIG. 4 illustrates an alternative example where the path selection circuitry 170 determines, for a current transfer, that the interconnect function 130 is still required, but decides to propagate the request in parallel through both the first path 125 and the second path 160. Hence, as with FIG. 3, the request is propagated to the interconnect function 130 via the first path 125, allowing the interconnect function to perform its analysis operation as before. In due course, when the response is available, it will be returned via the interface 110 to the master 105.

Meanwhile, the request is also propagated in parallel through the second path 160 to the interface 115, for forwarding on to the slave device 120, and the response from the slave is then returned via the second path to the master 105, being locally buffered in the buffer 180 if that response is available before the response from the interconnect function 130. This can further reduce latency, by enabling the request to be propagated to the slave device more quickly than may be possible using the approach of FIG. 3.

Figure 5:
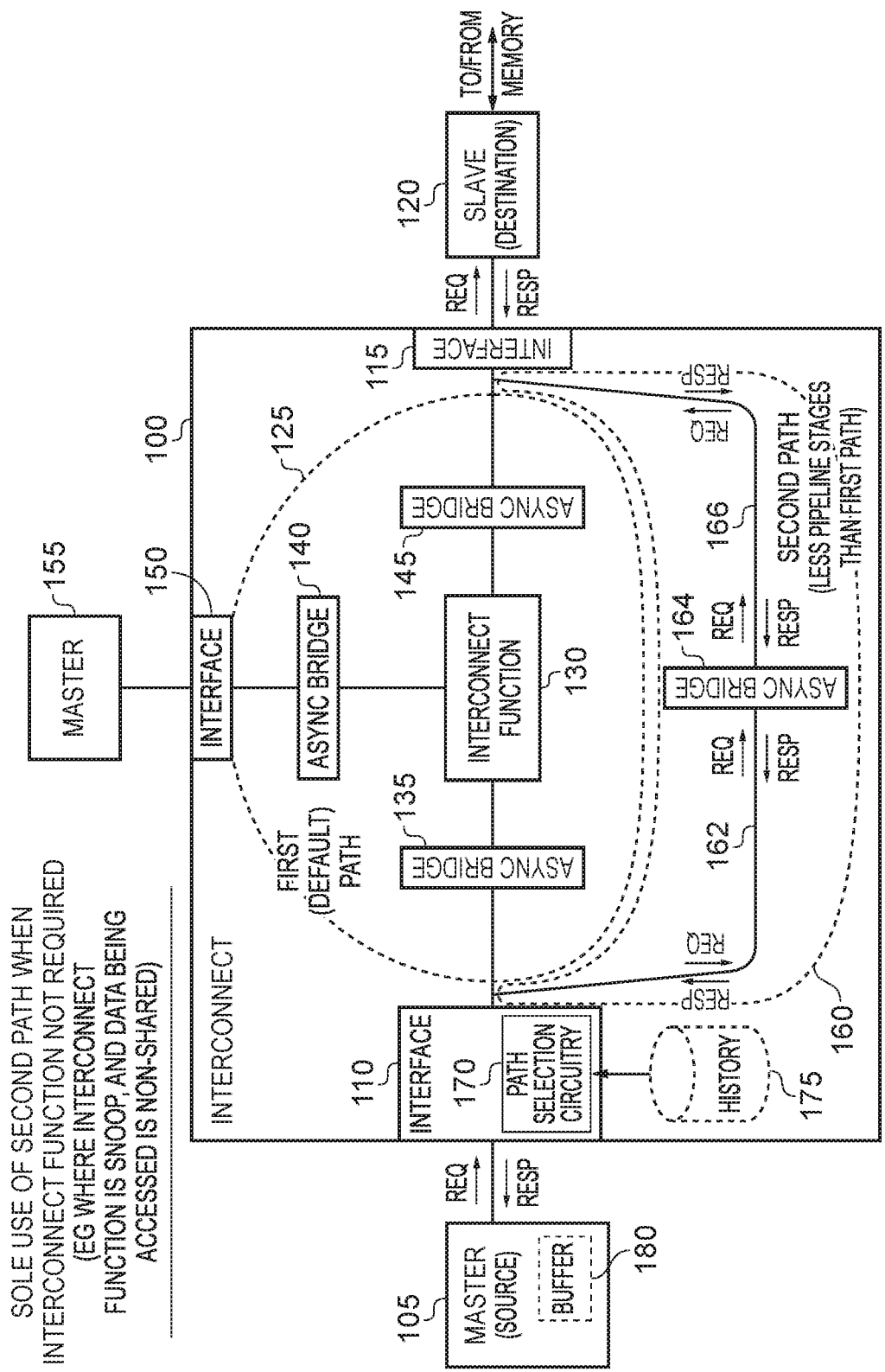

FIG. 5 illustrates an alternative scenario where the path selection circuitry 170 determines that the interconnect function 130 does not need to be used for a current transfer. For example, if the interconnect function 130 is snoop circuitry, no snoop operation may be required if the connect transfer is seeking to access a non-cacheable address. In that situation, the path selection circuitry 170 may be arranged to solely make use of the second path 160 for forwarding of the request to the slave device, and for routing of the response back to the master device.

In the example of FIG. 5, there may be no need to quarantine the response 180, since no analysis response from the interconnect function is awaited. However, it may still be the case that the response needs to be buffered for other reasons. For example, there may be some transaction ordering issues with regard to transactions issued by the master device to multiple slave devices, which require the responses of the transactions to be handled in a particular order. When the fast path is used for the transfer of one transaction, but no equivalent fast path exists, or is used, for another transaction destined to a different slave, it may be that some local buffering of the response at the master device 105 is still required to ensure that any transaction ordering requirements can be met.

Figure 6:
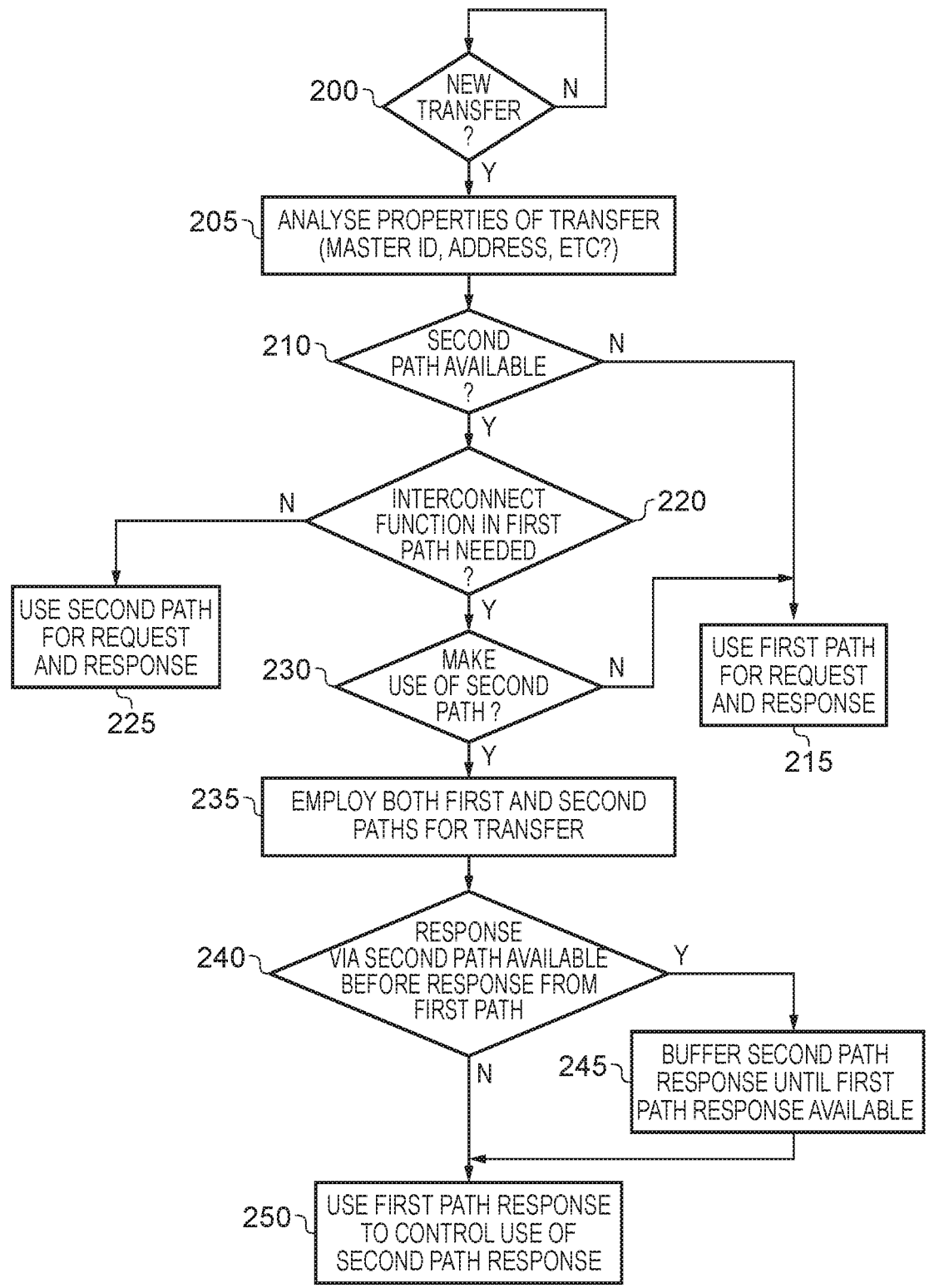
FIG. 6 is a flow diagram illustrating the processing of transfers when using the interconnect circuitry of FIG. 2 in accordance with one embodiment.

FIG. 6 is a flow diagram illustrating steps performed in accordance with one embodiment to determine usage of the first and second paths, and to control the handling of responses. In one embodiment the process of FIG. 6 can be performed on a transfer by transfer basis, and accordingly it is possible for different paths to be taken by different transfers of the same transaction. At step 200, it is determined whether there is a new transfer to be processed and, if so, at step 205 the path selection circuitry analyses properties of the transfer in order to determine whether a second path is available having regard to the particular combination of interfaces 110, 115 that are to be used. At this point, the path selection circuitry may have regard to the slave device to be accessed, the master device making the request, the address being accessed, etc. Having regard to the master device, in some embodiments it is possible for one master device to have multiple source identifiers, and it may for example be arranged that the second path is made available when the master device is using some source identifiers but not when it is using others. Having regard to the slave information, it may be that for a particular interface 110, a second path 160 is provided to the interfaces associated with certain slave devices but not to the interfaces associated with others, and accordingly the slave information can be used to determine whether there is in fact a physically provided second path available to use for the particular transfer being considered. The address information can also be used in some embodiments, as it may for example be decided that the second path should be made available to accesses to certain address ranges but not others.

Following the analysis at step 205, it is then determined at step 210 whether the second path is available. If not, then the process proceeds to step 215 where the first path is used for both the request and the response of the transfer.

However, if it is determined at step 210 that the second path is available, it is then determined at step 220 whether the interconnect function in the first path needs to be utilised for the current transfer. If not, the process proceeds to step 225, where the second path is used for both the request and the response of the transfer. This is for example the approach that was illustrated in FIG. 5.

If at step 220 it is determined that the interconnect function in the first path is needed, then at step 230 it is determined whether it is appropriate to make use of the second path in combination with the first path. At this point, the path selection circuitry may employ a number of techniques to decide whether to make use of the second path. For example, certain quality of service information may be provided in association with a transaction, for example to enable certain transactions to be prioritised over others. This information could be used by the path selection circuitry to decide whether or not the second path should be used. Further, or alternatively, the history information 175 discussed earlier may be referenced at this point. This may provide information about preceding transfers between the same master and slave, and provide an indication of how the interconnect function response influenced the use of the response from the slave. Hence, for example, if the history data indicates that any response from the slave is highly likely to be redundant once the interconnect function 130 response is available, it may decide to use the first path 125, and keep the second path 160 free for other transfers. Conversely, if the history information indicates that there is a high likelihood that the response from the slave will be used, it may decide to use the second path in combination with the first path. Accordingly, based on the analysis at step 230, the process will either proceed to step 215 where the first path will be used for both the request and the response, or proceed to step 235 where the first and second paths are used in parallel, as for example illustrated earlier with reference to the examples of FIGS. 3 and 4.

Following step 235, it is determined at step 240 whether the response via the second path is available before the response from the first path. As discussed earlier, in one embodiment this causes the response to be quarantined in a buffer 180 provided within the master, and hence the process proceeds to step 245 where the second path response is buffered until the first path response is available. Thereafter, or following step 240 if the response via the second path is not available before the response from the first path, the process proceeds to step 250 where the first path response is used to control the use of the second path response. How the first path response controls the use of the second path response will depend on the nature of the interconnect function 130, as will be apparent from the earlier discussions of the examples of snoop circuitry, security analysis circuitry, etc.

Figure 7:
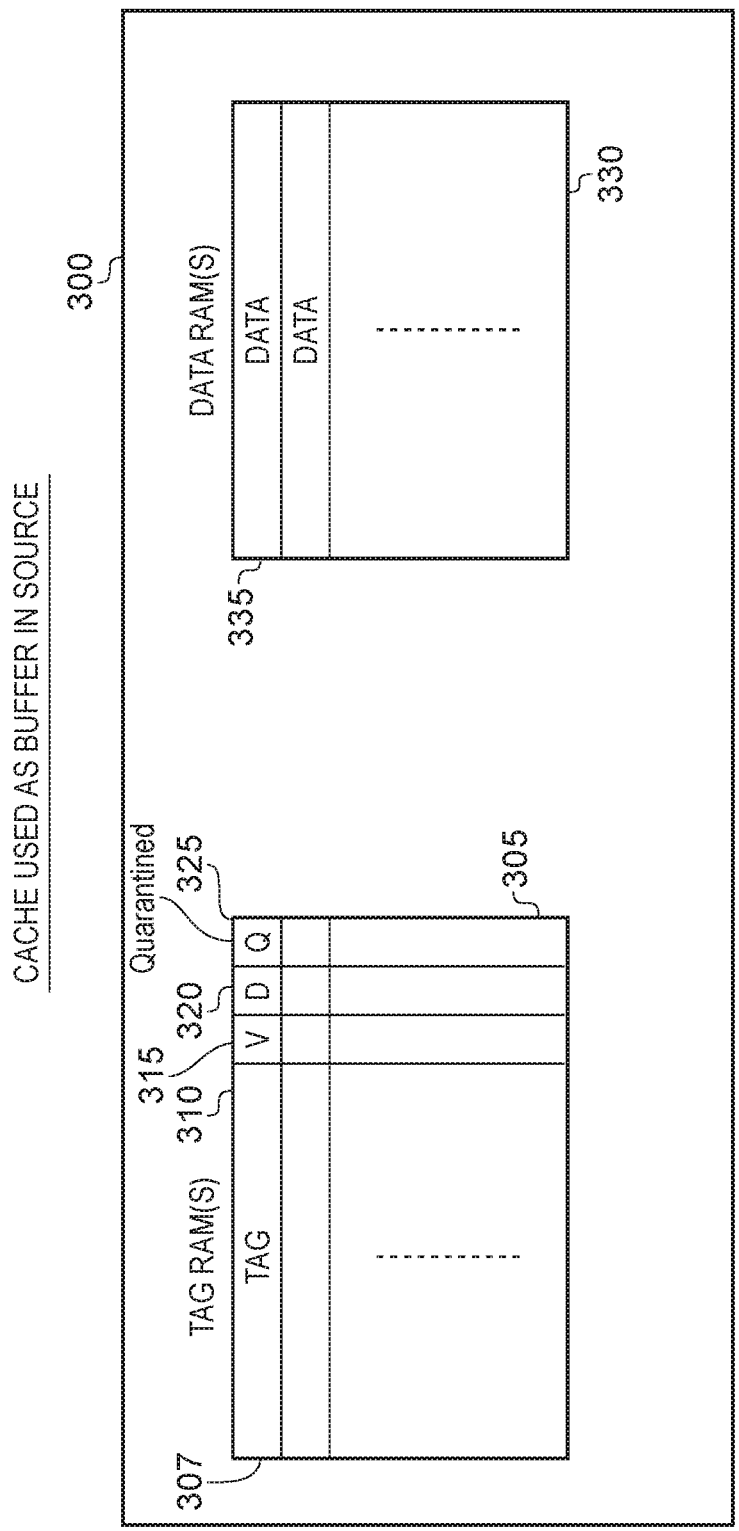
FIG. 7 schematically illustrates a modification that can be made to the structure of a cache within a master device in accordance with one embodiment, to enable it to buffer transfer responses received via the interconnect circuitry.

FIG. 7 schematically illustrates a cache 300 that may be provided within the master device 105. The cache includes one or more tag RAMs 305 and one or more associated data RAMs 330. For each cache line 335 within a data RAM 330, a corresponding entry 307 is provided within the associated tag RAM 305. In accordance with common practice, the tag RAM entry includes a tag field 310 that is compared with a portion of a specified address to determine whether there is a hit in the associated cache line, along with certain status bits such as a valid bit 315 to indicate whether the associated cache line is valid, and a dirty bit 320 to indicate whether the data in the associated cache line is dirty, i.e. is more up-to-date than the version saved in memory. In accordance with one embodiment, an additional status bit called the quarantine bit 325 may be added that can be set to identify whether the data in the associated cache line is currently quarantined. Whilst it is quarantined, that data is not allowed to be used by the master device, and accordingly setting of the quarantine bit 325 will prevent a hit being detected for that cache line while its contents are quarantined. Once it is later decided that the response can be used, then the quarantine bit can be cleared so as to cause the cache line contents to be used in the normal manner. As an alternative to providing a separate quarantine field, it may be possible to encode the quarantine status of the cache line within an unused combination of existing status bits. Purely by way of example, in some embodiments if the valid bit indicates that the cache line is invalid but the dirty bit indicates that the cache line is dirty, this would normally equate with an invalid state. It may be possible to use this particular encoding to represent the setting of the quarantined state.

By such an approach, it is possible to very efficiently incorporate the buffer mechanism 180 within the master device without needing to provide a separate, dedicated, buffer. Most master devices will already include a cache structure which can be used to incorporate the buffer functionality in accordance with the mechanism of FIG. 7.

Figure 8:
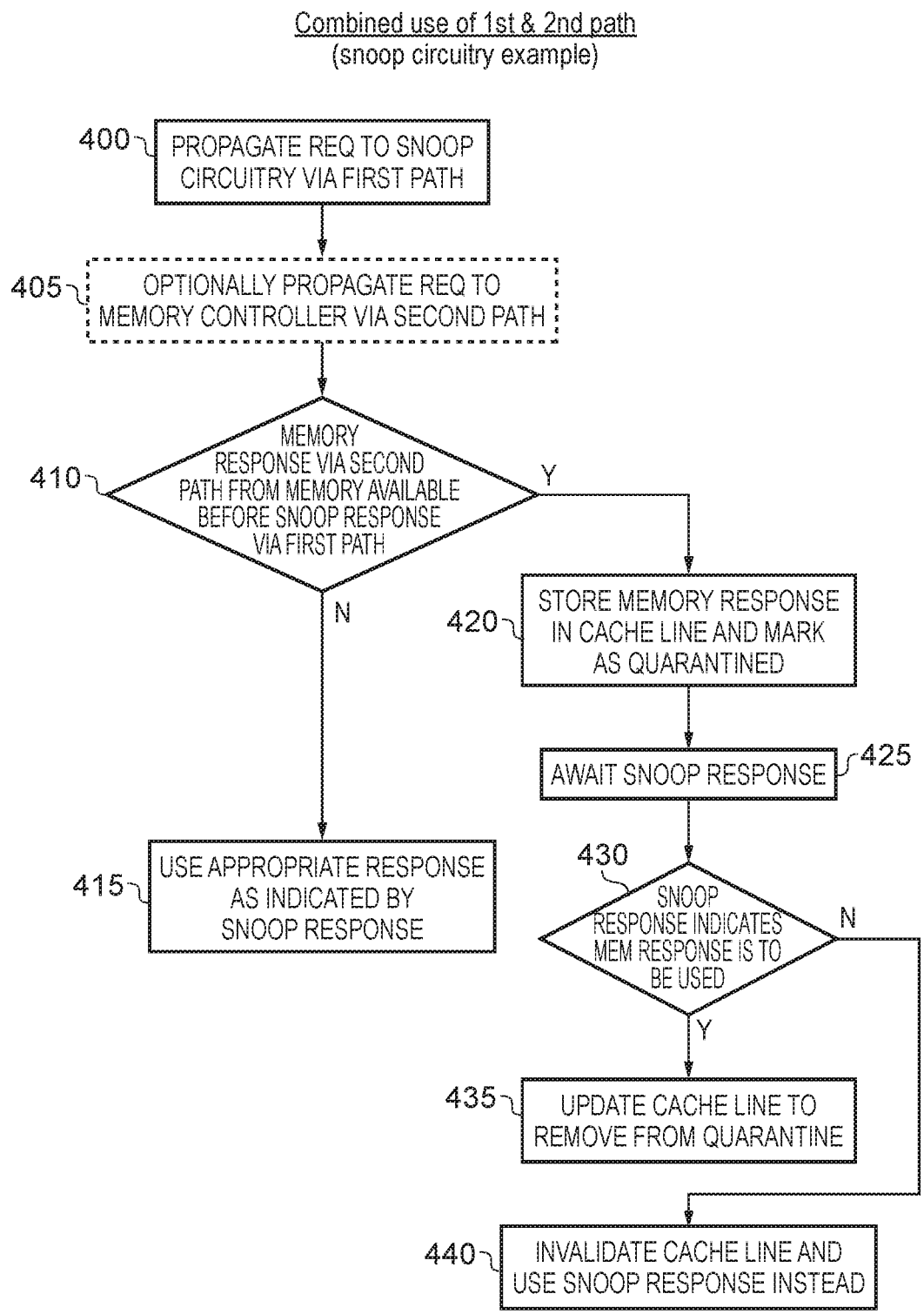
FIG. 8 is a flow diagram illustrating how both the first and second paths in the interconnect circuitry of FIG. 2 may be used in accordance with one embodiment where the interconnect includes snoop circuitry.

FIG. 8 is a flow diagram illustrating how the use of the first and second paths may be combined for a particular transfer, considering the example where the interconnect function 130 is snoop circuitry. At step 400, the request of the current transfer is propagated to the snoop circuitry via the first path 125. At step 405, the request may optionally be propagated to the memory controller via the second path 160, i.e. if the approach discussed earlier with reference to FIG. 4 is adopted. Alternatively, it may be the snoop circuitry's responsibility to forward the request on to the slave device interface 115, either once it has decided that that is necessary based on the snoop responses, or if it decides to speculatively forward the request on whilst the snoop responses are awaited.

In the example illustrated in FIG. 8, it is assumed that the second path is used for at least the response of the transfer from the slave device (as would be the case if the approach of FIG. 3 or the approach of FIG. 4 is utilized). At step 410, it is determined whether the memory response via the second path from the memory is available before the snoop response via the first path. If not, then at step 415 the master merely uses the appropriate response as indicated by the snoop response. However, otherwise the process proceeds from step 410 to step 420 where the memory response is stored in a cache line of the master device 105 and marked as quarantined.

Thereafter, at step 425 the snoop response is awaited by the master device. It is then determined at step 430 whether the snoop response indicates that the memory response is to be used. If so, then at step 435 the relevant cache line is updated to remove it from quarantine. Using the example of FIG. 7, this may for example merely involve clearing the quarantine status bit 325.

If, however, at step 430 the snoop response indicates that the memory response is not to be used, then the relevant cache line contents are invalidated at step 440, and the snoop response may for example be used instead. In one embodiment, the snoop response will include the requested data from the master, and accordingly in one such embodiment that data provided as part of the snoop response can be used to overwrite the current cache line contents that contains the response from the memory device. At this point, the quarantine bit will be cleared, and the valid bit will be set to identify the cache line contents as being valid and usable by the master device.

It will be appreciated that a similar operation flow could be adopted in the example where the interconnect function 130 performs a decryption key operation. In particular, at step 420, the memory response stored in the cache line and marked as quarantined would be an encoded version of the data. The snoop response would then provide the decryption key. Accordingly, when the snoop response was received, unless the snoop response indicated that the data should not be used, the data could be retrieved from the cache line, decrypted, and then the decrypted version written back into the same cache line to overwrite the encrypted contents. At that point, the cache line could be marked as valid and no longer quarantined.

As a variant on the above approach, it may in some instances be decided that there is no need for a separate quarantine flag, since the fact that the data is encrypted will prevent it being used in its intended form by the master device. In such a case the encrypted data may be considered to be implicitly quarantined, awaiting the key required to decrypt the data.

Figure 9:
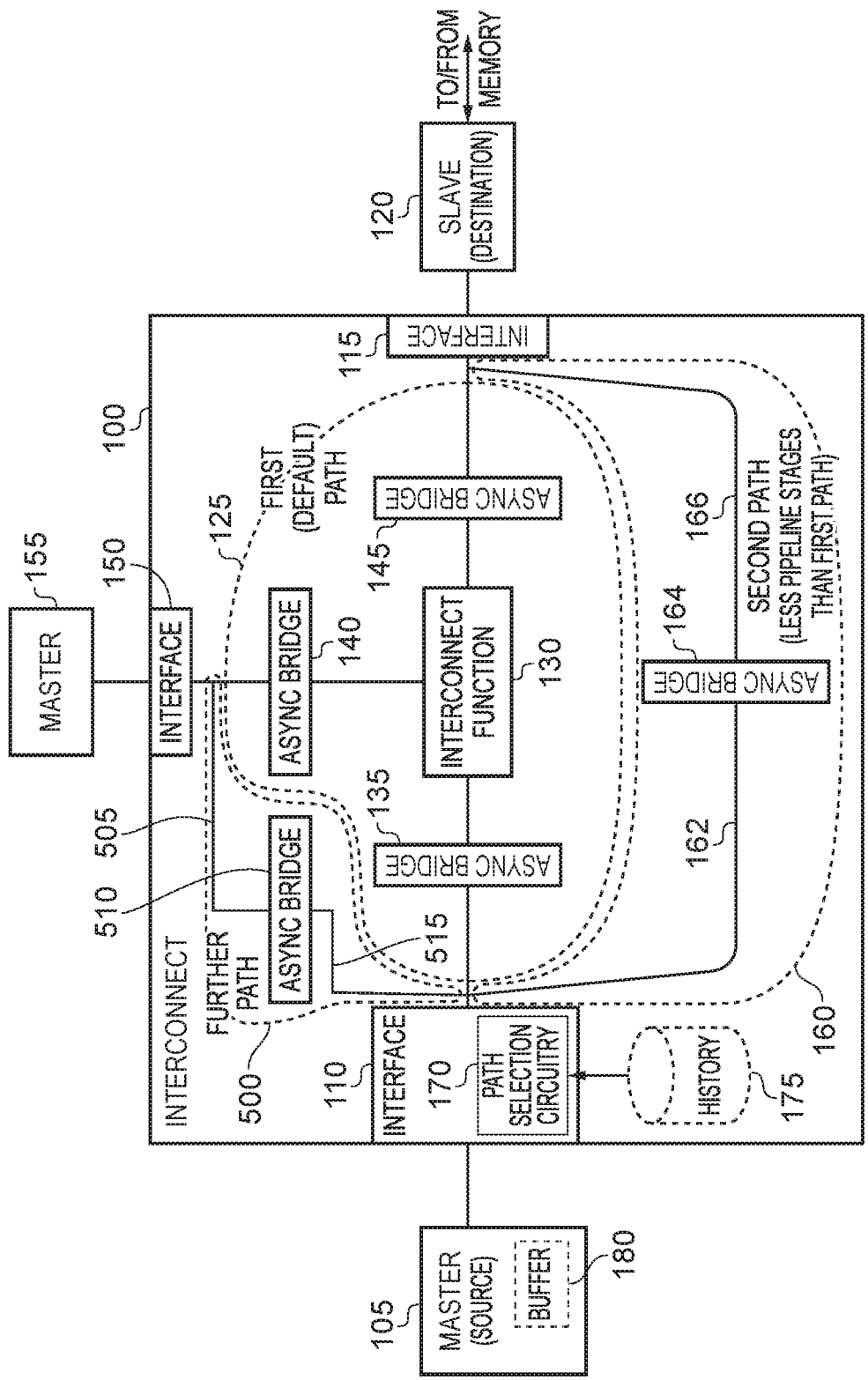
FIG. 9 illustrates how one or more further paths may also be provided within the interconnect circuitry of FIG. 2, in accordance with one embodiment.

Whilst in FIG. 2, only one additional path is shown in addition to the default path, it will be appreciated that in other embodiments further additional fast paths could be provided. FIG. 9 illustrates one example arrangement where, in addition to the first default path 125 and the second path 160, a further path 500 is provided between the interface 150 and the interface 110, this further path 500 consisting of an asynchronous bridge component 510 and associated wiring paths 505, 515. Such a path could for example be used to enable the master device 155 to forward back to the master device 105 data in one of its cache lines if the snoop operation performed under the control of the interconnect function 130 identifies that the master 155 holds in its cache the data that the master 105 has requested. This could further reduce latency in the handling of certain transactions.

Figure 10:
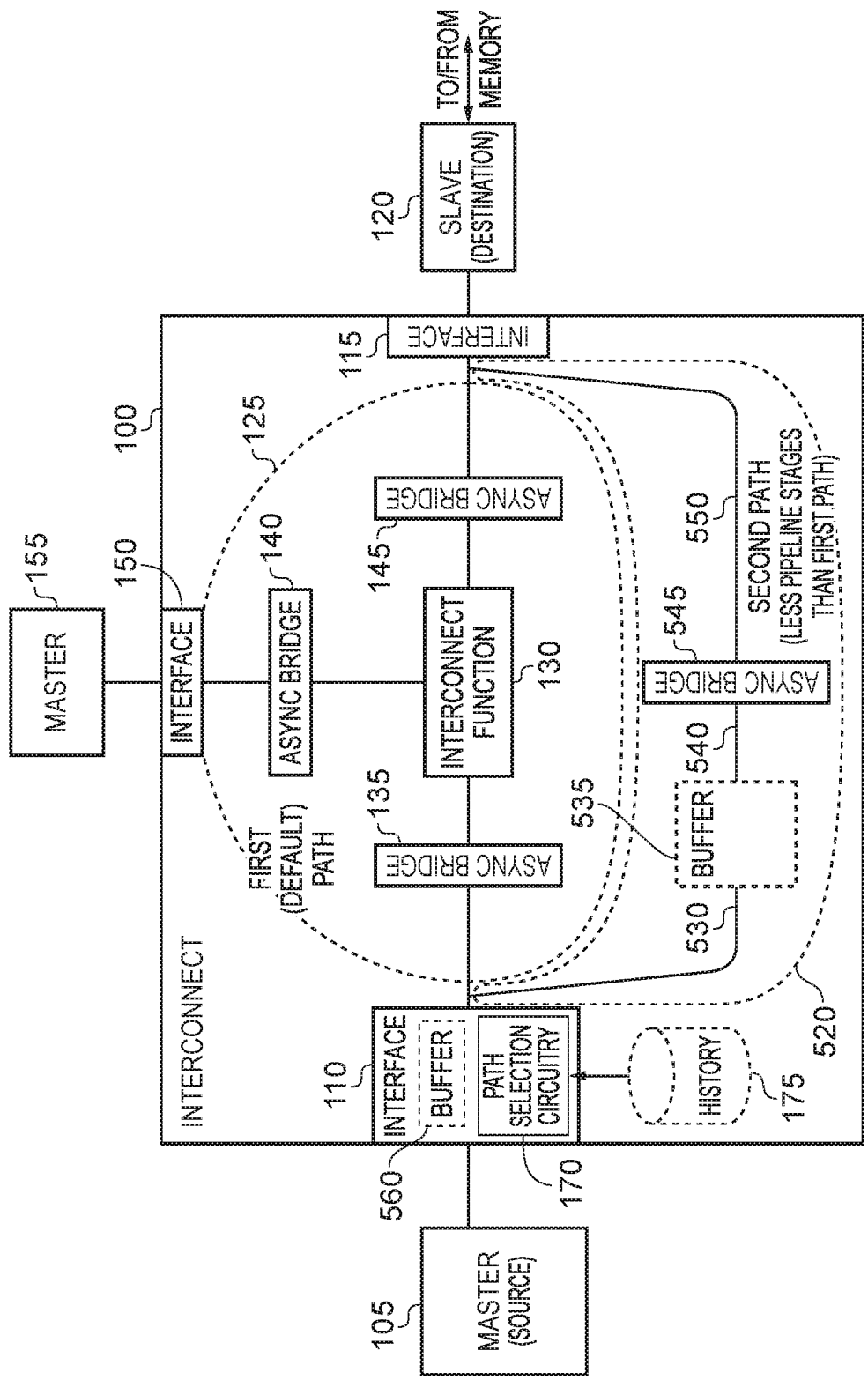
FIG. 10 illustrates possible locations for buffer circuits in accordance with one embodiment.

Whilst in the earlier embodiments, a buffer 180 may be provided within the master device 105 for buffering responses provided via the second path from the slave 120, in an alternative embodiment such a buffer may be provided elsewhere within the system, for example within the interconnect. Two possible locations are shown within FIG. 10. In particular, a buffer 560 could be provided within the interface 110 to buffer responses until a point is reached where it is determined that those responses can be used by the master device 105, at which point they are then output to the master device. Hence, by such an approach, the responses could be buffered within the buffer 560 until the associated snoop responses are received, identifying whether the data that is buffered should be used or not. Further, as discussed earlier, the master may actually have a number of transactions in flight with multiple slave devices, and the buffer 560 could provide a mechanism for providing some reordering of responses if required.

As an alternative to the buffer 560, or in addition, a buffer 535 may be provided within the second path 520, in this example the second path consisting of the buffer 535, the asynchronous bridge 545 and the intervening wiring 530, 540, 550. This may be useful to allow some reordering of responses within the second path. For example, it may be that the interface 110 associated with the master 105 has a number of second, fast, paths provided to different interconnect interfaces to multiple slave devices. The portion of those different second paths closest to the interface 110 may actually be shared, and for example the buffer circuitry 535 may incorporate some merging circuitry to merge responses from multiple different second paths associated with multiple different slave devices. The buffer circuitry 535 would hence enable the merging of those various responses and/or reordering of responses if required prior to passing those responses back to the interface 110.

In addition, if desired, some buffering may be provided within the slave device 120 to enable speculative accesses to be performed in association with any external memory coupled thereto, and the responses to be buffered within the slave 120 so that they are immediately available should a request for that data be received.

From the above described embodiments, it can be seen that such embodiments provide an additional fast path that may be selectively used in combination with, or instead of, a first default path, in order to reduce latency and therefore increase performance in a system through the removal of excess cycles and/or the hiding of cycles in the transport of transactions through an interconnect fabric. The described technique can be implemented in a bus protocol agnostic manner and hence can be used in a wide variety of situations irrespective of the bus protocol used. The techniques can be used in a variety of different interconnect circuits. With the introduction of Network-on-Chip (NoC) techniques, the described approaches may be particularly useful as such techniques provide more inherent flexibility for routing within the existing network.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. Interconnect circuitry comprising:
a first interface to couple to a master device;
a second interface to couple to a slave device, transactions being performed between the master device and the slave device, where each transaction comprises one or more transfers, each transfer comprising a request and a response;
a first connection path between the first interface and the second interface comprising a first plurality of pipeline stages, the first connection path forming a default path for propagation of the requests and responses of the transfers;
a second connection path between the first interface and the second interface comprising a second plurality of pipeline stages, where the second plurality is less than the first plurality; and
path selection circuitry to determine on a transfer-by-transfer basis presence of a fast path condition, in the presence of the fast path condition the path selection circuitry causing at least one of the request and the response for a given transfer to be propagated via the second connection path.

2. Interconnect circuitry as claimed in claim 1, further comprising:
processing circuitry to initiate an analysis operation for a transfer that produces an analysis response that influences usability of a response generated by the slave device for that transfer, the processing circuitry being located within the first connection path.

3. Interconnect circuitry as claimed in claim 2, wherein said path selection circuitry is arranged to determine the presence of said fast path condition for a current transfer when the current transfer has no requirement for said analysis operation to be performed.

4. Interconnect circuitry as claimed in claim 2, wherein the path selection circuitry is responsive to a current transfer requiring said analysis operation to be performed, to evaluate specified criteria to determine whether said fast path condition is present and, in the presence of said fast path condition, to cause both the first connection path and the second connection path to be used for the current transfer.

5. Interconnect circuitry as claimed in claim 4, wherein the path selection circuitry is arranged to cause the request of the current transfer to be propagated via the first connection path and the response of the current transfer from the slave device to be propagated via the second connection path.

6. Interconnect circuitry as claimed in claim 4, wherein the path selection circuitry is arranged to cause the request of the current transfer to be propagated via the first connection path to the processing circuitry and via the second connection path to the second interface, and the response of the current transfer from the slave device to be propagated via the second connection path.

7. Interconnect circuitry as claimed in claim 4, wherein the master device is prevented from making use of the response of the current transfer from the slave device before the analysis response is provided by the processing circuitry.

8. Interconnect circuitry as claimed in claim 1, wherein at least one of the first interface and the second connection path includes buffer circuitry to buffer the response of the current transfer from the slave device until a predetermined condition is met.

9. Interconnect circuitry as claimed in claim 1, wherein:
the first connection path comprises multiple asynchronous bridge components, each asynchronous bridge component comprising multiple pipeline stages; and
the second connection path comprises less asynchronous bridge components than are provided within the first connection path.

10. Interconnect circuitry as claimed in claim 2, wherein the processing circuitry comprises snoop circuitry to perform, as the analysis operation, a coherency operation amongst multiple master devices coupled to the interconnect circuitry, and the analysis response comprises a snoop response.

11. Interconnect circuitry as claimed in claim 10, wherein for a current transfer, the snoop response identifies whether data within a response generated by the slave device for the current transfer is to be disregarded in favour of data associated with the snoop response.

12. Interconnect circuitry as claimed in claim 2, wherein the processing circuitry comprises security checking circuitry to perform, as the analysis operation, a security operation, and the analysis response includes information controlling use of the response generated by the slave device.

13. Interconnect circuitry as claimed in claim 12, wherein the analysis response identifies whether the master device is allowed to perform the transfer.

14. Interconnect circuitry as claimed in claim 12, wherein the analysis response provides a decryption key to be used to decrypt data provided in the response generated by the slave device.

15. Interconnect circuitry as claimed in claim 4, wherein said specified criteria identify one or more properties which the transfer is to have in order to trigger the fast path condition.

16. Interconnect circuitry as claimed in claim 4, wherein when evaluating said specified criteria the path selection circuitry is arranged to reference history data maintained about previous transfers routed between the first and second interfaces.

17. Interconnect circuitry as claimed in claim 1, wherein the path selection circuitry is arranged to provide control information for at least one of the request and the response of a transfer to identify which of the first connection path and the second connection path is to be used.

18. Interconnect circuitry as claimed in claim 1, wherein the path selection circuitry is provided in association with at least one of the first interface and the second interface.

19. A master device for coupling to interconnect circuitry, the master device comprising:
buffer circuitry of the master device to buffer the response of a current transfer from a slave device until a predetermined condition is met, the master device and the slave device coupled to the interconnect circuitry which comprises:
a first interface to couple to the master device;
a second interface to couple to the slave device, transactions being performed between the master device and the slave device, where each transaction comprises one or more transfers, each transfer comprising a request and a response;

a first connection path between the first interface and the second interface comprising a first plurality of pipeline stages, the first connection path forming a default path for propagation of the requests and responses of the transfers;

a second connection path between the first interface and the second interface comprising a second plurality of pipeline stages, where the second plurality is less than the first plurality; and path selection circuitry to determine on a transfer-by-transfer basis presence of a fast path condition, in the presence of the fast path condition the path selection circuitry causing at least one of the request and the response for a given transfer to be propagated via the second connection path.

20. A master device as claimed in claim 19, wherein the master device is prevented from using the response of the current transfer whilst it is buffered in the buffer circuitry.

21. A master device as claimed in claim 19, wherein the buffer circuitry is implemented within a cache of the master device, the cache providing state information in association with each cache line to identify whether the data in that cache line is buffered data awaiting said predetermined condition.

22. A method of operating interconnect circuitry having a first interface to couple to a master device, and a second interface to couple to a slave device, transactions being performed between the master device and the slave device, where each transaction comprises one or more transfers, each transfer comprising a request and a response, the method comprising:

providing a first connection path between the first interface and the second interface comprising a first plurality of pipeline stages, the first connection path forming a default path for propagation of the requests and responses of the transfers;

providing a second connection path between the first interface and the second interface comprising a second plurality of pipeline stages, where the second plurality is less than the first plurality; and determining presence of a fast path condition, and in the presence of the fast path condition propagating at least one of the request and the response for one or more transfers via the second connection path.

* * * * *